(12) United States Patent
Jun et al.

(10) Patent No.: US 6,789,607 B1
(45) Date of Patent: Sep. 14, 2004

(54) DUAL ZONE VEHICLE AIR DISTRIBUTION APPARATUS

(75) Inventors: Matthew L. Jun, Waterford, MI (US); Stefan H. Schwarz, Orion Township, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 0 days.

(21) Appl. No.: 09/373,127

(22) Filed: Aug. 12, 1999

Related U.S. Application Data

(63) Continuation-in-part of application No. 09/282,488, filed on Mar. 31, 1999, now Pat. No. 6,484,755.

(51) Int. Cl.[7] .............................. B60H 1/00; B60H 3/00
(52) U.S. Cl. ........................... 165/43; 165/42; 165/203; 237/12.3 A; 237/12.3 B; 454/156; 454/160; 454/161
(58) Field of Search ................................ 165/202, 203, 165/42, 43; 237/12.3 A, 12.3 B; 454/156, 160, 161

(56) References Cited

U.S. PATENT DOCUMENTS

| 3,267,962 A | | 8/1966 | Josephson et al. | |
| 3,881,546 A | * | 5/1975 | Otsuka et al. | ................. 165/42 |
| 4,072,186 A | | 2/1978 | Barton | |

(List continued on next page.)

FOREIGN PATENT DOCUMENTS

| CH | 168658 | | 8/1933 | |
| DE | 2310934 | | 9/1974 | ................. 454/156 |
| DE | 2757651 | | 4/1981 | ................. 454/160 |
| DE | 3526518 A1 | | 4/1986 | |
| DE | 3529-940 A1 | | 2/1987 | |
| EP | 0267101 | | 5/1988 | |
| EP | 0 733 502 | | 9/1996 | |
| EP | 0 745 034 | * | 12/1996 | |
| FR | 2700502 A1 | | 7/1994 | |
| FR | 2757594 | | 6/1998 | |
| JP | 56-43017 | * | 4/1981 | ................. 165/43 |
| JP | 57-26008 | * | 2/1982 | ................. 165/42 |
| JP | 57-130815 | * | 8/1982 | ................. 165/43 |
| JP | 122213 | | 7/1983 | ................. 165/43 |
| JP | 58-126210 | * | 7/1983 | ................. 165/43 |
| JP | 60-209318 | * | 10/1985 | |
| JP | 193918 | | 8/1986 | ................. 165/43 |
| JP | 63-57318 | | 3/1988 | |
| JP | 1-94018 | | 4/1989 | |
| JP | 5-203255 | | 8/1993 | |
| JP | 10-244824 | * | 4/1998 | |
| JP | 10-250345 | * | 9/1998 | |
| WO | WO96/29211 | * | 9/1996 | |

*Primary Examiner*—John K. Ford
(74) *Attorney, Agent, or Firm*—J. Gordon Lewis

(57) ABSTRACT

An air distribution apparatus for a vehicle includes a partition disposed within a housing which separates a first longitudinal airstream from a blower and a cooling element into first and second airstreams, each separately directed through a heater element to form first and second recombined airstreams. The partition redirects the first and second recombined airstreams to a second direction angularly disposed from the first direction of air flow to enable the first and second output airstreams to be separately transmitted to first and second separate zones within the vehicle. Independently movable blend valves are interposed in the first and second airstreams to provide independent selection of temperature of the first and second output airstreams.

14 Claims, 3 Drawing Sheets

U.S. PATENT DOCUMENTS

| | | | |
|---|---|---|---|
| 4,420,115 A | * 12/1983 | Matsushima et al. | ... 237/12.3 A |
| 4,742,762 A | 5/1988 | Ito et al. | |
| 4,785,640 A | 11/1988 | Naruse | |
| 4,852,638 A | 8/1989 | Hildebrand et al. | |
| 5,080,282 A | 1/1992 | Harmon | |
| 5,101,883 A | * 4/1992 | Kinmartin et al. | ............ 165/42 |
| 5,152,335 A | 10/1992 | Doi et al. | |
| 5,309,731 A | 5/1994 | Nonoyama et al. | |
| 5,545,085 A | 8/1996 | Danieau | |
| 5,647,399 A | 7/1997 | Andersen | |
| 5,673,964 A | 10/1997 | Roan et al. | |
| 5,722,883 A | 3/1998 | Schwarz | |
| 5,725,052 A | 3/1998 | Kawai et al. | |
| 5,737,930 A | 4/1998 | Karl | |
| 5,738,579 A | 4/1998 | Pommier et al. | |
| 5,766,070 A | 6/1998 | Schwarz | |
| 5,775,407 A | 7/1998 | Inoue | |
| 5,803,160 A | 9/1998 | Danieau | |
| 5,862,677 A | * 1/1999 | Kim et al. | .................... 165/42 |
| 5,873,777 A | 2/1999 | Auvity | |
| 5,931,733 A | 8/1999 | Danieau | |
| 5,980,380 A | * 11/1999 | Schwarz | .................... 454/156 |
| 5,988,263 A | 11/1999 | Schwarz | |
| 6,007,421 A | 12/1999 | Schwarz | |
| 6,019,288 A | 2/2000 | Arold et al. | |
| 6,139,273 A | 10/2000 | Schwarz et al. | |
| 6,278,083 B1 | 8/2001 | Schwarz | |
| 2002/0007944 A1 | 1/2002 | Schwarz | |

\* cited by examiner

DUAL ZONE VEHICLE AIR DISTRIBUTION APPARATUS

RELATED APPLICATION

This application is a continuation-in-part of U.S. patent application Ser. No. 09/282,488, filed Mar. 31, 1999 now U.S. Pat No. 6,484,755.

BACKGROUND OF THE INVENTION

1. Field of the Invention

The present invention relates, in general, to air handling distribution apparatus in automotive vehicles and, more particularly, to separate dual temperature zone air distribution apparatus in automotive vehicles.

2. Description of the Art

Modern automotive vehicles are provided with sophisticated air distribution systems which provide the conventional temperature control via selection between heating and ventilation or cooling modes or a combination thereof, and selection of various distribution paths including instrument panel distribution toward the front seat occupants, floor distribution or windshield defrost through various ducts and vents, along with the recent trend to multiple, independently selectable temperature zones, which typically allow the driver and a front seat passenger to independently select different air flow temperatures.

Although a variety of configurations of such vehicle air distribution systems exist, all such systems include a blower which draws in fresh air from the exterior of the vehicle and/or recirculates interior air and generates an airstream which is directed towards an evaporator core, if vehicle air condition is provided, to cool the air. The cooled air is then directed through a heater element located downstream of the evaporator core. One or more blend doors are mounted in the air distribution housing to select the amount of cooled air from the evaporator core which is directed through or which bypasses the heater core. The blend doors are moved by a user manipulatable lever or actuator mounted on the vehicle instrument panel which enables the user to select either full cooled air, full heated air or a blend of heated and cooled air.

The heated or cooled air or a blend thereof is then directed to a distribution or mode section zone of the air distribution apparatus wherein user manipulatable, instrument panel mounted, actuators control the opening and closing of doors or panels to direct air to a particular part of the vehicle passenger cabin including directly toward the front seat occupants, upward onto the vehicle windshield in a defrost mode, downward toward the vehicle floor, or a combination of toward the vehicle occupants and toward the vehicle floor.

Most vehicles, regardless of the vehicle configuration or the specific shape of the air distribution apparatus, include these same elements. In one type of vehicle air distribution apparatus, the blower, evaporator core, heater core and the blend and distribution doors are arranged in a so-called "vertical" sequence along the vehicle center line. A vertically extending partition within the housing of this type of air distribution system divides the cooled air flow into separate airstreams through the heater core whereby the separate airstreams of independently controlled cooled and heated air are directed through separate distribution ducts to the left and right front sides of the vehicle.

In another typical vehicle air distribution arrangement, the blower housing and evaporator core and heater core are disposed to one side of the vehicle center line, i.e., to the right in a left-hand drive vehicle, and disposed behind the vehicle glove box within the passenger foot well compartment. This arrangement is a so-called "longitudinal" or horizontal distribution system.

However, the longitudinal type air distribution systems have problems with respect to providing independent, dual temperature zones within the vehicle passenger cabin as the separate air streams which are typically flowing transverse to the longitudinal center line of the vehicle must be redirected into a 180° opposite air streams for the front seat passenger zone. This creates complexity in the design of the air distribution duct system.

Thus, it would be desirable to provide a dual zone vehicle air distribution apparatus utilizing "longitudinal air distribution architecture" which has a simplified design for distributing separate temperature airstreams to the driver and front seat passenger zones of the vehicle. It would also be desirable to provide such an air distribution apparatus which utilizes a minimal amount of components for effecting the desired independently selectable air temperature zones within the vehicle. It would also be desirable to provide such an air distribution apparatus capable of providing totally independent dual temperature zones within a vehicle which can be disposed in the same amount of interior vehicle space as a conventional air distribution apparatus which provides only a single temperature zone for the entire passenger cabin.

SUMMARY OF THE INVENTION

The present invention is a dual zone vehicle air distribution apparatus which affords significant advantages over previously devised vehicle air distribution apparatus utilizing so-called "longitudinal air distribution architecture".

According to one aspect of the present invention, the air distribution apparatus includes a housing with a blower mounted in the housing in communication with a housing inlet, the blower having an outlet. A plenum is formed in the housing and has an inlet for receiving air discharged from the outlet of the blower. A partition is disposed in the housing in communication with the plenum and separates the air flow through plenum into first and second separate air flow streams, each flowing in a first flow direction. A heater element is disposed downstream of the plenum for heating air discharged to the plenum. The heater element is disposed in each of the first and second airstreams. Movable blend members or doors are mounted in the housing and movable between positions under independent actuator control to determine the volume of air of each of the first and second airstreams which bypasses the heater element, and the volume of air in the first and second airstreams which flows through the heater element to be discharged and recombined into the first and second airstreams. The partition cooperates with the housing for redirecting the first and second recombined airstreams from the first flow direction to a second flow direction angularly disposed from the first direction. Ducts are fluidically connected to the housing for selectively receiving the redirected first and second airstreams and for discharging the redirected first and second airstreams into selected separate regions of a vehicle.

In one aspect of the invention, a cooling element is mounted in the housing downstream of the blower for cooling air discharged from the outlet of the blower. The cooled air is discharged to the plenum.

According to another aspect of the present invention, the blend members include first and second valves or doors disposed in each of the first and second air passages.

According to one aspect, the first and second valves in each of the first and second or lower and upper airstreams are linked together for simultaneous movement between opposed fully opened and fully closed positions.

The partition includes a deflector portion which redirects the first and second airstreams angularly to the second flow direction. Preferably, the second flow direction is disposed substantially 90° from the first flow direction.

According to one aspect of the invention, the partition includes a first section carrying the first and second airstreams and a second section which redirects the first and second airstreams to the second flow direction. Preferably, the first and second sections of the partition are unitarily formed as one-piece member.

According to one aspect of the invention, the heater element is disposed through the partition and fluidically communicating with both of the first and second airstreams.

An interior wall formed in the housing divides each of the first and second airstreams into first and second sub-first airstreams and first and second sub-second airstreams. An aperture is formed in the interior wall in fluid flow communication with the heater element allowing the first and second sub-first airstreams and the first and second sub-second airstreams to separately recombine downstream to the heater element to reform the first and second airstreams in the selected combination of heated and non-heated air.

The air distribution apparatus of the present invention provides totally independent, dual temperature zones within a vehicle passenger cabin while, at the same time, the apparatus housing consumes a minimal amount of space within the vehicle. The air distribution apparatus of the present invention also provides dual independent temperature zones with a minimal number of components.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
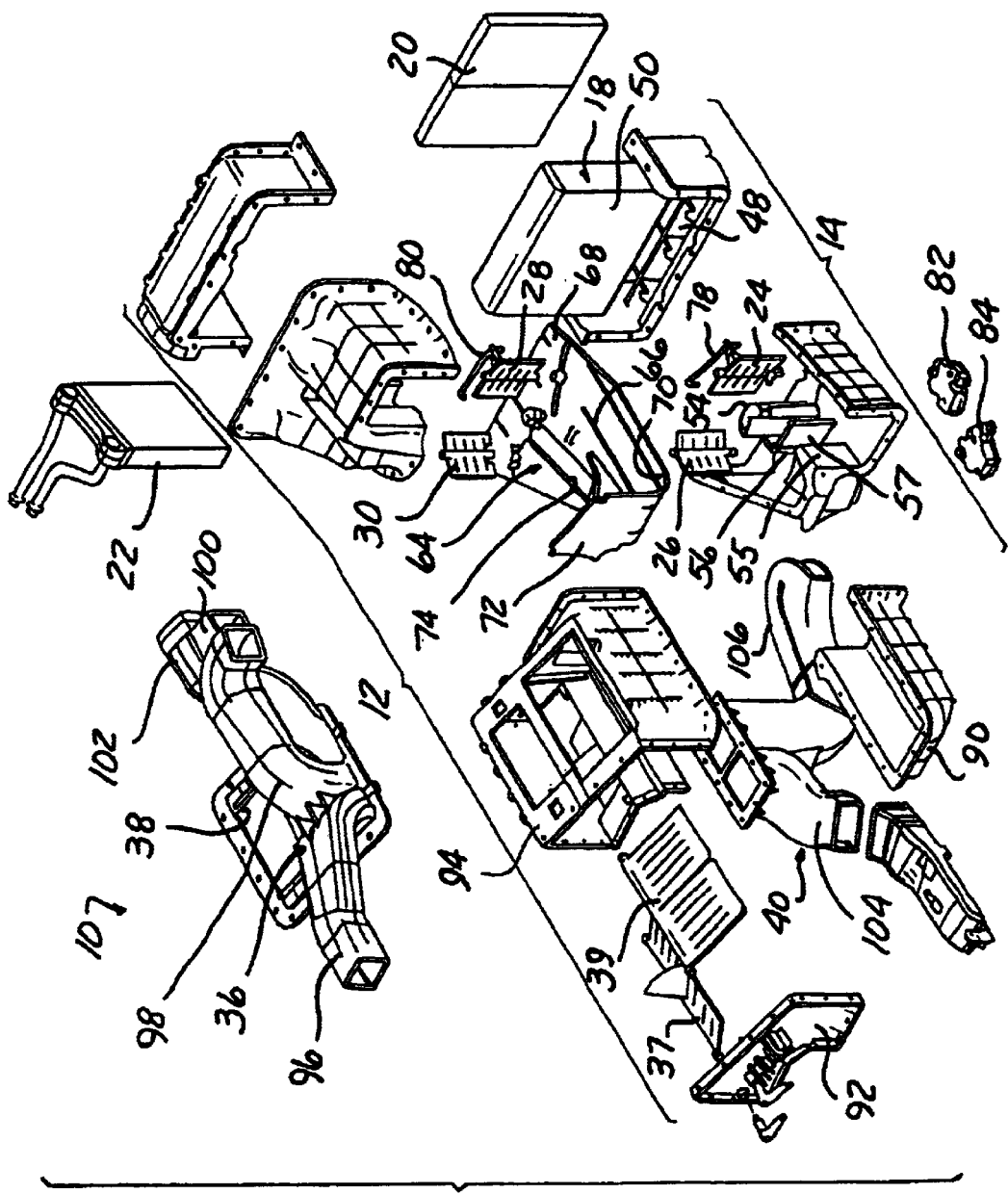
FIG. 1 is an exploded perspective view of a major portion of an air distribution apparatus according to the present invention.

Referring now to the drawing, and to FIGS. 1–5 in particular, there is depicted a dual zone, vertically separate, fully independent temperature selectable vehicle air distribution apparatus 10. The apparatus 10 has a so-called "longitudinal architecture" wherein a substantial portion of the components of the apparatus 10 are arranged along a "longitudinal axis" which generally extends transverse to the vehicle center line.

The apparatus 10 includes a housing 11 formed, by example, of upper and lower housing sections 12 and 14, respectively. For clarity, the individual upper and lower housing sections 12 and 14 are illustrated in FIG. 1 as separate components or casings. It will be understood that the upper and lower housing sections 12 and 14 may be each formed as unitary, one-piece structures or of several joined sections similar to that shown in FIG. 1.

The upper and lower housing sections 12 and 14, respectively, are joined together at peripheral flanges by means of suitable fasteners, such as bolts, not shown.

The main components of the air distribution apparatus 10 include an air flow generator or blower 16, a cooling element or evaporator core 18, with an optional air filter 20, a heater element or core 22, blend valves 24, 26, 28 and 30, a partition member or divider 64, distribution control panels and distribution ducts including a front seat passenger face distribution duct assemble 36, a windshield defrost duct assembly, not shown, and a floor duct distribution assembly 40.

Not shown, but which form a conventional part of every vehicle air distribution apparatus, are vehicle driver and passenger control actuators or switches which are typically mounted on the vehicle instrument panel and which enable the driver and front seat passenger to independently select the temperature of the air distributed to the driver and front seat passenger zones of the vehicle interior cabin as well as enabling single control of the air distribution in the front seat passenger, defrost or floor modes.

The actuators, which can be rotary switches or slide levers are conventionally connected by cables to the individual blend and mode distribution valves or doors 24, 26, 28 and 30, by means of cables or, if electric based, by conductors to a motor to rotate the individual valves or doors 24, 26, 28, and 30.

Figure 2:
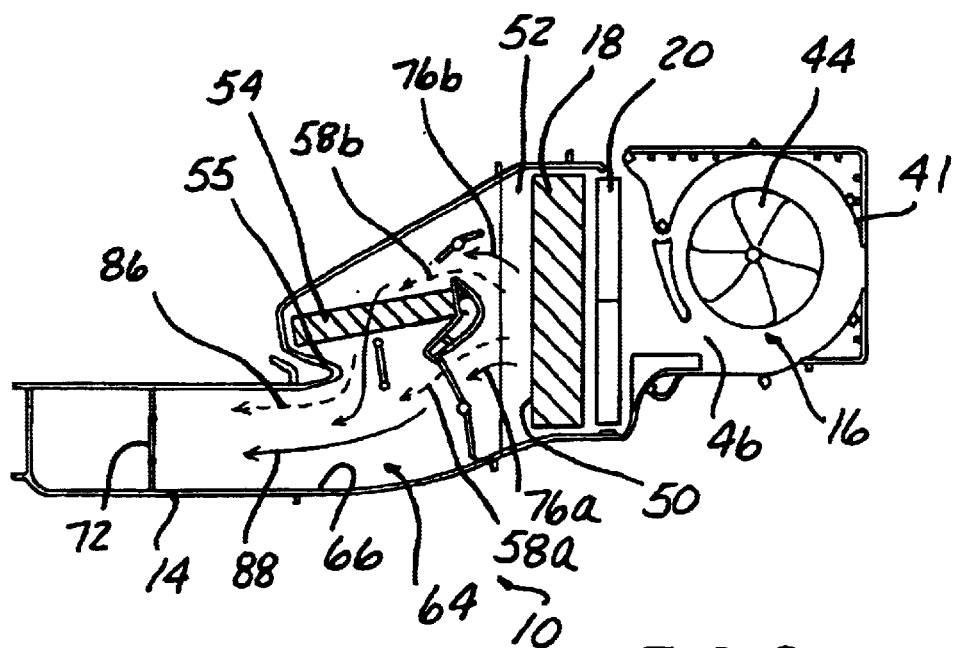
FIG. 2 is a plan, pictorial representation of the interior of the assembled air distribution apparatus of FIG. 1.
Figure 3:
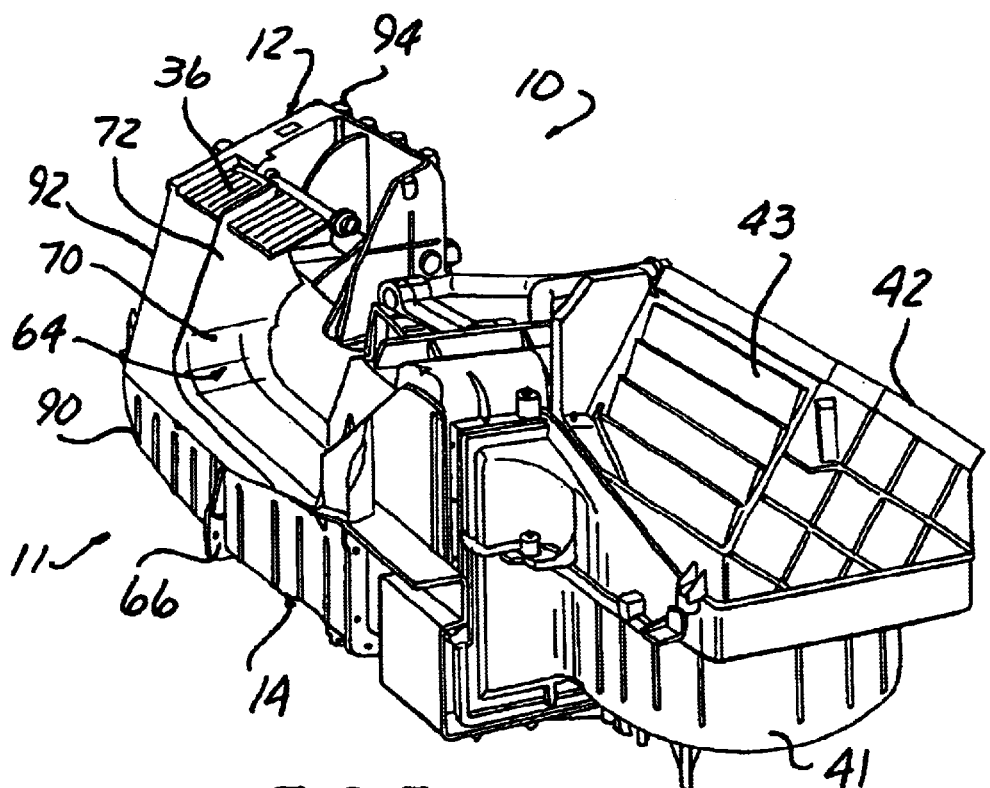
FIG. 3 is a partially broken away, perspective view of the assembled air distribution apparatus shown in FIGS. 1 and 2.

As shown in FIG. 2, the airstream generator 16 includes a conventional blower in the form of a motor driven fan 44 having a plurality of vanes oriented in a vertical direction in a normal vehicle mounting position. The blower 16 is mounted in a cylindrical housing 41 and draws in air through a fresh air intake vent 42 mounted above the housing 41 which is open to exterior vehicle ambient air. An optional intake vent 43 is connected to receive recirculated vehicle cabin air may also be provided above the housing 41. Inside or outside air is drawn in the blower portion of the housing by the high speed rotation of the blower fan 44. The blower housing 41 has an outlet 46 which transmits the high speed air flow to the adjacent, downstream disposed cooling element, such an evaporator core 18. The optional air filter 20 may be interposed between the blower 16 and the evaporator core 18.

It will be understood that the air distribution apparatus 10 may also be constructed without a cooling element or evaporator core 18. In this aspect of the invention, the blower provides ventilation air to the passenger cabin along with heated air rather than cooled or air conditioned air when the cooling element or evaporator core 18 is employed.

The cooling element 18 may be any type of cooling devise capable of providing cool or conditioned air. The following description of the use of an evaporator core as the cooling element 18 will be understood to be by example only.

The evaporator core 18 is typically a cooling heat exchanger which is disposed in fluid flow communication with the outlet 46 of the blower housing 41. The evaporator core 18 cools and dehumidifies the air transmitted from the blower fan 44 by the evaporation action of refrigerant flowing there through. Typically, the evaporator core 18 forms part of an air conditioning unit on the vehicle which also includes, although not shown, a compressor for compressing the refrigerant, a condenser, and an expansion valve or flow restrictor.

As shown in FIG. 1, the evaporator core 18 is removably mountable in a mounting bracket 48 located in the lower housing section 14.

The cooled air exiting from an outlet side 50 of the evaporator core 18 enters an enlarged plenum or air chamber 52 which is formed between the upper and lower housing sections 12 and 14. The plenum 52 is at least as large in cross section as the cross section of the evaporator core 18 so as to be capable of receiving all of the air from the outlet side 50 of the evaporator core 18.

An interior wall 54 is formed at one end of plenum 52 in the lower housing section 14 as shown in FIG. 1. The interior wall 54 divides the end of the plenum 52 into two portions, each forming a separate air flow path or passages referred to as first air flow paths or passages 58a and 58b. An aperture 56 is formed between the interior wall 54 and an adjacent boss 55 in the lower housing section 14 disposing the first air flow passages 58a and 58b in fluid flow communication.

A partition 64 is mounted within the joined housing sections 12 and 14. The partition 64 is preferably formed of a lightweight, rigid material, such as a suitable plastic. It will be understood that the partition 64 may be formed of other suitable materials which afford easy formability and long-term use under typical vehicle heating and cooling operating ranges.

As shown in FIGS. 1–5, the partition 64 has a first section 66 extending from a first end 68 to a second end 70. The first section 66 can have the illustrated planar shape disposed in parallel to the bottom wall of the corner housing section 14. Alternately, the first section 66 can have other shapes, such as slightly curved concave or convex shapes. Further, the first section 66 of any shape can also be disposed at an angle of about ±15%. with respect to the bottom wall of the lower housing portion 14.

Figure 5:
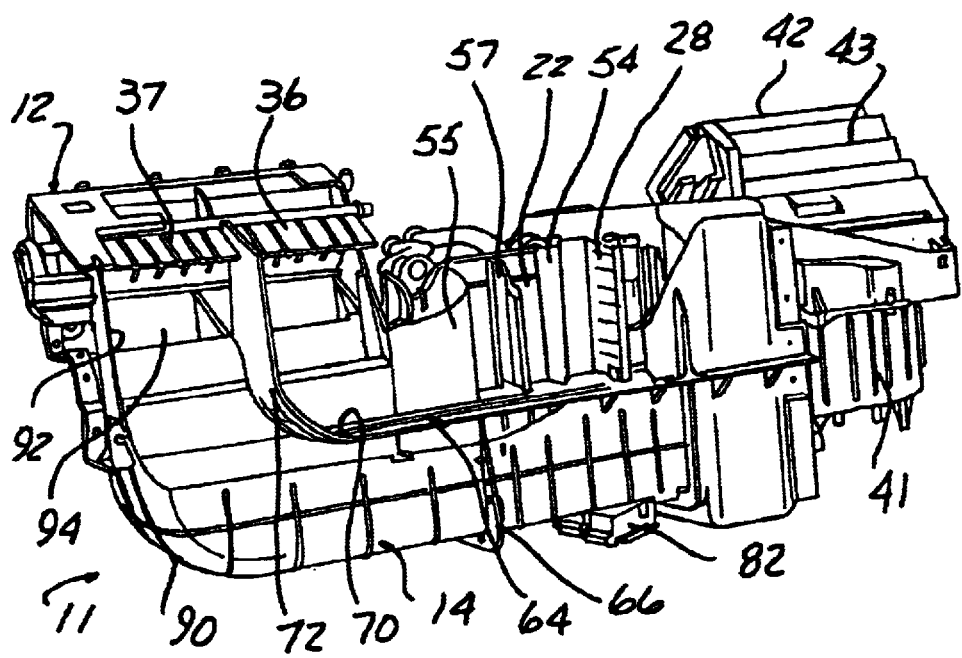
FIG. 5 is a partially broken away, perspective view showing interior features of the air distribution apparatus of the present invention.

A second section 72 extends at an angle from the second end 70 of the first section 66. By way of example only, the second section 72 is generally disposed substantially perpendicular to the plane of the first section 66. The second section 72 merges with the second end 70 of the first section 66 by a smooth radius as shown in FIGS. 1 and 5, by example only.

The partition 64 is fixedly mounted within the housing sections 12 and 14 by suitable means. By way of example, the partition 64 is mounted in a fixed position by means of the fasteners joining the mating mounting flanges of the upper and lower housing sections 12 and 14. It should be noted that the partition 64 may also be fixedly mounted between the upper and lower housing sections 12 and 14 separate from the housing sections 12 and 14.

An aperture or slot 74 is formed in the first section 66 of the partition 64 and disposed adjacent to the interior wall 54 and boss 55 in the lower housing section 14 when the partition 64 is mounted in the joined housing sections 12 and 14. The aperture 74 receives the heating element or heater core 22 in a slide-in mount. A rib 57 extends from the bottom of the lower housing section 14 intermediate the boss 55 and interior wall 54. The rib 57 supports the lower portion of the heater core 22 in position through the slot 74 in the partition member 64.

The heater core 22 is connected to the vehicle engine cooling system and acts as a heat exchanger which heats the cooled air supplied from the evaporator core 18 by using engine coolant fluid flowing there through as a heat source.

Alternately, the heating element 22 may include other heating devices, such as a radiant electrical heater.

Figure 4:
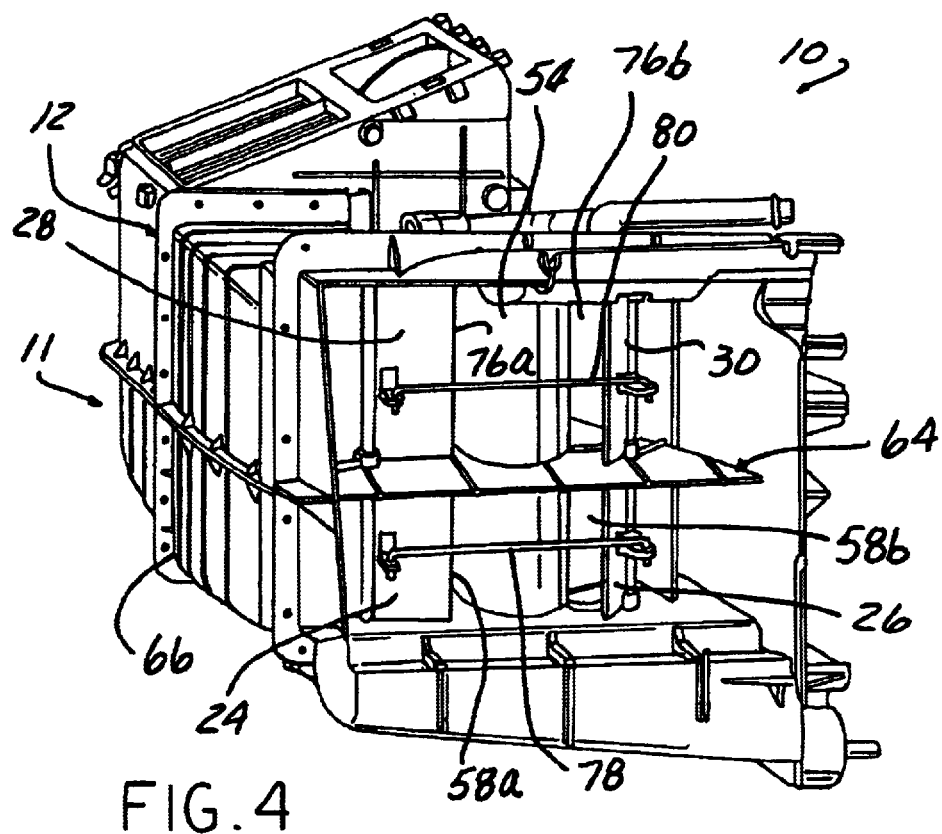
FIG. 4 is a partial, perspective view showing a portion of the interior of the assembled air distribution apparatus of the present invention.

As shown in FIG. 4, the partition 64 divides the plenum 52 into first and second, separate main air flow passages denoted by reference numbers 58 and 76, respectively. As described above, the first air flow passage 58 is subdivided into first and second separate, sub-first air flow passages 58a and 58b by the wall 54, heater core 22 and boss 55. Likewise, the heater core 22 divides the second air flow passage 76 into first and second sub-second air flow passages 76a and 76b. In the orientation of the housing 10 shown in the drawing, the first and second main air flow passages 58 and 76 are also lower and upper aligned passages.

Separate first and second blend valves or doors 24 and 26 are provided for the air passages 58a and 58b. Similarly, third and fourth blend valves or doors 28 and 30 are individually provided for the air flow passages 76a and 76b. Further, each pair of first and second blend doors 24 and 26, and 28 and 30 are slaved together by links or rods 78 and 80, respectively.

Separate drive motors 82 and 84 are provided for each pair of first and second blend doors 24 and 26, and 28 and 30, respectively. The output shaft of the drive motor 82 is connected to a rotatable rod which extends through the first blend door 26 and is fixed thereto for simultaneous, bidirectional rotation of the first blend door 24 with similar bidirectional rotation of the output shaft of the drive motor 82. The link 78 couples the first blend door 24 to the second blend door 26 thereby providing simultaneous pivotal movement of the first and second blend doors 24 and 26.

The first and second blend doors 24 and 26 are oriented such that one blend door is fully closed and sealed against mating surfaces in the lower housing section 14 when the other blend door is fully open as shown in FIG. 1 for the first and second blend doors 24 and 26. First blend door 26 is depicted in a fully closed position wherein peripheral edges of the first blend door 26 seal against and end portion of the interior wall 54 in the lower housing section 14 and a flange on an outer side portion of the lower housing section 14.

In this manner, one front seat passenger, such as the driver, by rotating or sliding a suitable actuator on the vehicle instrument panel, for example, can control the temperature of the airstream generated by the blower 16 which is directed through the various duct assemblies toward the driver independent of any other temperature zone in the passenger cabin. In the present example, movement of the actuator activates the drive motor 82 to rotate the drive shaft coupled to the first blend door 24 a predetermined amount as determined by the amount and direction of movement of the actuator. As stated above, depending upon the amount of movement of the actuator, the first blend door 24 can move from a fully closed position shown in FIG. 1 to a fully open position or any position in between the full open and full closed positions. Simultaneously, the second blend door 26 moves from a fully open position to a fully closed position. Intermediate or blend positions wherein both of the first and second blend doors 24 and 26 are partially open, as shown in FIG. 4, can also be selected thereby providing a selectable temperature range for the driver.

The third and fourth blend doors 24 and 26 are similarly arranged and coupled by the link 80 for simultaneous movement from a first closed position as shown for the third blend door 28 to a fully open position as shown by the fourth blend door 30. As with the first and second blend doors 24 and 26, the third and fourth blend doors 28 and 30 are arranged oppositely from each other such that the first blend door 24 is fully closed when the fourth blend door 30 is fully open. An output shaft of the drive motor 84 is coupled to the fourth blend door 30. For example, the output shaft of the actuator 84 can extend through a bore formed in a shaft in the second blend door 26 to the fourth blend door 30 which is coaxially aligned with the bore in the second blend door 26.

As the first and second blend doors 24 and 26 are fully independently movable by one front seat occupant from the third and fourth blend doors 28 and 30, one occupant, such as the driver, can select one desirable temperature; while the other front seat passenger can independently select a different temperature. These different temperatures result from independent movement of the blend door pairs 24 and 26, and 28 and 30.

Regardless of the position of the first pair of blend doors 24 and 26, the air passing through the first air passages 58a and 58b, if any, will be combined in the first air passage downstream of the aperture 56 in the interior wall 54. This forms a first output airstream 86 for one vehicle occupant, such as the driver.

Similarly, the second airstreams 76a and 76b combine downstream of an upper portion of the heater core 22 to form a second output airstream 88 which is directed to the other front seat vehicle occupant, such as the right side front seat passenger, by the ducts. The first airstream 86 and the second airstream 88 remain separated by the partition 64, an end portion 90 of the lower housing section 14 and an end portion 92 of the upper housing section 12. The end portions 90 and 92 combine with the end 72 of the partition 64 to deflect the first output airstream 86 at an angle of substantially 90° from the direction or flow axis of the first input airstream 58. Similarly, the second section 72 of the distribution member 64 in conjunction with the surrounding upper housing section 12 deflects the second output airstream 88 at a substantially 90° angle from the flow direction of the second input airstream 76.

The first and second output airstreams 86 and 88 flow in the new direction into an output plenum 94 formed in the upper housing section 12. The output plenum 94 maintains the first and second output airstreams 86 and 88 separate in two chambers and directs the respective first and second output airstreams 86 and 88 to separate distribution duct assemblies, such as a face duct assembly 36 which, in an illustrated example shown in FIG. 1, is formed of first and second ducts 96 and 98 which have output ends disposed adjacent to a directionally adjustable vent, not shown, mounted on the vehicle instrument panel and facing the driver. A separate face duct assembly formed of ducts 100 and 102 also extends from the output plenum 94 to output ends disposed adjacent to directionally adjustable vents on the instrument panel in proximity with the front seat passenger to thereby direct the second output airstream 88 toward the front seat passenger.

The floor duct apparatus 40 also includes first and second floor duct assemblies 104 and 106 which maintain the first and second output airstreams 86 and 88 separate and directed toward the floor adjacent each front seat passenger.

Both output airstreams 86 and 88 are combined into the defrost duct apparatus 38 and directed to the vehicle windshield.

As described above, two distribution doors 39 and 37 are pivotally moved by mechanisms responsive to movement of actuators, such as a rotary knobs or slide switches on the vehicle instrument panel which the driver manipulates to select the desired distribution of the airstreams within the interior of the vehicle, that is, between an upward defrost mode in which both output airstreams 86 and 88 are directed upward onto the vehicle windshield, a front face output mode wherein the airstreams 86 and 88 are directed toward the front seat occupants, a floor mode wherein the airstreams 86 and 88 are directed toward the floor or feet of the front seat occupants and a possible blend mode wherein the airstreams 86 and 88 are divided between the front forward output direction and the floor. It will also be understood that other distribution variations can also be employed, such as three door mode variations or barrel doors.

In summary, there has been disclosed a unique air distribution apparatus for a vehicle wherein the operative components of the air distribution apparatus are arranged along a longitudinal axis generally transverse to the vehicle center line. The unique provision of the partition changes the direction of each of two independent airstreams from an initial axial directional to a second output axial direction generally perpendicular to the first axial flow direction. The separate airstreams are distributed through various ducts to the individual driver and front seat passenger at temperatures independently selected by the driver and front seat passenger.

What is claimed is:

1. An air distribution apparatus for a vehicle comprising:

a housing;

a blower mounted in the housing in communication with an inlet in the housing and an outlet;

a plenum formed within the housing, the plenum having an inlet for receiving air discharged from the outlet of the blower;

a partition seperate from the housing, the partition mounted within the housing so as to span opposing sidewalls of said casing and communicating with the plenum, the partition separating the air flow through the plenum into first and second separate airstreams, each having a first flow direction parallel to one another;

an interior wall disposed within the housing and communication with the plenum, the wall disposed at an angle relative to the partition and separating the first airstream into third and fourth sub-streams and the second airstream into fifth and sixth sub-streams;

a heater element disposed within the housing downstream of the plenum for heating air discharged from the plenum, the heater element disposed in each of the first and second airstreams through a gap in the partition;

movable blend members, mounted in the housing and movable between positions, to determine the volume of air of each of the first and second airstreams which bypasses the heater element and the volume of air in the first and second airstreams which flows through the heater element to be discharged into the first and second airstreams as heated air;

the partition defining a shaped non-planar single wall surface redirecting the first and second airstreams from the first flow direction generally parallel to one another and to the housing to a second flow direction generally parallel to one another, where the second flow direction is angularly disposed from the first flow direction by an angle corresponding to a directional change in said housing; and ducts fluidly connected to the housing for selectively receiving the first and second airstreams and for selectively discharging the first and second airstreams into separate regions of the vehicle interior, respectively.

2. The apparatus of claim 1 further comprising:
a cooling element mounted in the housing downstream of the outlet of the blower for cooling air discharged form the outlet of the blower, the cooled air discharged to the plenum.

3. The apparatus of claim 1 wherein the blend members comprise:
a plurality of movable valves, at least one valve disposed discretely in each of the sub-streams.

4. The apparatus of claim 3 wherein a first and a second of said movable valves in each of the first and second airstreams are linked together for simultaneous movement between opposed fully closed positions and fully opened positions.

5. The apparatus of claim 1 wherein the partition includes a deflector portion deflects the first and second airstreams substantially 90° from the first direction to the second direction.

6. The apparatus of claim 1 wherein the partition member comprises:
a first section cooperating with the housing to form the first and second airstreams downstream of the plenum; and
a second section disposed at an angle to the first section, the second section cooperating with the housing to redirect the first and second airstreams to the second direction.

7. The apparatus of claim 6 wherein:
the first and second sections of the partition are formed as a unitary one-piece member.

8. The apparatus of claim 1, wherein the shaped non-planar surface further comprises:
the partition having a first section and a second section, the first section positioned at an angle with respect to the second section.

9. An air distribution apparatus for a vehicle comprising:
a housing having a plenum, an inlet for receiving air, an outlet for expelling air, and a length, width and height;
a blower for directing air in a first flow direction to the inlet of the housing;
means for dividing airflow through the plenum, dividing means dividing air received at the inlet into at least four discrete passages and expelled air into at least two discrete passages at the outlet; and
means for selectively controlling an airflow through each passage;
a heating element positioned in at least two of the at least four discrete passages for heating air;
a partition separate from the housing, the partition mounted within the housing and extending horizontally across the plenum, extending the width and length of the housing, dividing the plenum into at least two vertically stacked sub-plenums, each sub-plenum defining a passage having generally parallel first flow directions with respect to one another and to the housing;
an interior wall extending vertically across the plenum, extending the height of the housing and a predetermined width and length of the housing, the predetermined length less than the length of the housing, for dividing each of the sub-plenums into at least two horizontally stacked ducts, the wall positioned spaced adjacent from the inlet and engaged with the partition to form at least four discrete passages for airflow; and
a shaped non-planar single wall surface defined by the partition for directing air flow from the at least two discrete passages at the outlet in a second generally parallel flow direction angularly disposed from the first generally parallel flow direction by an angle corresponding to a directional change of said housing.

10. The apparatus of claim 9 wherein the housing is modular, having a top portion and a bottom portion.

11. The apparatus of claim 9 wherein the housing is formed of plastic in a plastic molding process.

12. The apparatus of claim 9 wherein the controlling means further comprises:
at least one valve movable between an open position and closed position for each of the at least four passages at the inlet.

13. The apparatus of claim 9 further comprising:
a plurality of ducts for receiving the expelled air from the outlet, at least one duct for each of the at least two passages at the outlet, and for directing the expelled air to different positions within an interior of the vehicle.

14. The apparatus of claim 9, wherein the shaped non-planar surface further comprises:
the partition having a first section and a second section, the first section positioned at an angle with respect to the second section.

* * * * *